United States Patent [19]

Katayma

[11] Patent Number: 4,466,306

[45] Date of Patent: Aug. 21, 1984

[54] MECHANISM FOR PREVENTING MISOPERATION IN A MANUAL TRANSMISSION

[75] Inventor: Nobuaki Katayma, Toyota, Japan

[73] Assignee: Toyota Jidosha Kabushiki Kaisha, Aichi, Japan

[21] Appl. No.: 403,803

[22] Filed: Jul. 30, 1982

[30] Foreign Application Priority Data

Aug. 26, 1981 [JP] Japan ................................ 56-134640

[51] Int. Cl.³ ........................ G05G 5/10; B60K 17/34
[52] U.S. Cl. ........................................ 74/477; 180/247
[58] Field of Search ........................... 74/477; 180/247

[56] References Cited

U.S. PATENT DOCUMENTS 2,314,833  3/1943  Keese ............................... 180/247 X
2,329,916  9/1943  Lamb et al. ......................... 180/247
3,529,487  9/1970  Dolan .............................. 180/247 X Primary Examiner—Allan D. Herrmann
Attorney, Agent, or Firm—Parkhurst & Oliff

[57]  ABSTRACT

Disclosed herein is a mechanism for preventing misoperation, that is, change from a four-wheel drive operation to a two-wheel drive operation at a low speed geared position or select-operation to a low speed gear during a two-wheel drive operation in a manual transmission which permits change from a two-wheel drive operation to a four-wheel drive operation and vice versa and also permits a shift-operation to a low speed gear upon running on a steep slope, sandy place and rough road. The mechanism comprises a stopper arm extending from a shift-and-select lever toward a drive changing shaft and a stopper surface formed on one end of the drive changing shaft. The stopper surface is effective to abut against the stopper arm in the two-wheel drive position of the drive changing shaft and is effective to prevent the shift-and-select lever from engaging the shift head fixed to the fork shaft for a low speed gear.

2 Claims, 6 Drawing Figures

MECHANISM FOR PREVENTING MISOPERATION IN A MANUAL TRANSMISSION

BACKGROUND OF THE INVENTION

This invention relates to a mechanism for preventing misoperation in a manual transmission which permits change from a two-wheel drive operation to a four-wheel drive operation and vice versa, and more particularly to a mechanism for preventing a select-operation to a low speed gear during a two-wheel drive operation and also preventing change from a four-wheel drive operation to a two-wheel drive operation especially at a low speed geared position upon running on a steep slope, sandy place and rough road.

The low speed gear is usually employed for running in a four-wheel drive operation, and during such a running operation, load accompanied by power transmission is charged on each differential gear for front and rear wheels. Therefore, overload is prevented from being applied to one of both differential gears. However, when the low speed gear is used during a two-wheel drive operation, the whole load is applied to the differential gear of the drive wheel. Accordingly, it is required to employ differential gears and drive shafts which are able to withstand larger load in comparison with those of a usual two-wheel drive vehicle having no low speed gear. As the result, common differential gear and drive shaft cannot be employed in a vehicle which permits change from a two-wheel drive operation to a four-wheel drive operation and vice versa.

SUMMARY OF THE INVENTION

Accordingly, a primary object of the present invention is to provide a mechanism for preventing misoperation in a manual transmission which is effective to prevent a select-operation to a low speed gear during a two-wheel drive operation.

Another object of the present invention is to provide a mechanism for preventing misoperation in a manual transmission which is effective to prevent change from a four-wheel drive operation to a two-wheel drive operation at a low speed geared position.

A further object of the present invention is to provide a mechanism for preventing misoperation in a manual transmission which is effective to prevent overload from being applied to the differential gear and drive shaft during a two-wheel drive operation.

Still a further object of the present invention is to provide a mechanism for preventing misoperation in a manual transmission in which common differential gear and drive shaft may be employed in a vehicle which permits change from a two-wheel drive operation to a four-wheel drive operation and vice versa.

According to the present invention, in a manual transmission which permits change from a two-wheel drive operation to a four-wheel drive operation and vice versa and also permits a shift-operation to a low speed gear upon running on a steep slope, sandy place and rough road, there is disclosed a mechanism for preventing misoperation, that is, change from a four-wheel drive operation to a two-wheel drive operation at a low speed geared position or select-operation to a low speed gear during a two-wheel drive operation. The mechanism comprises a stopper arm extending from a shift-and-select lever toward a drive changing shaft and a stopper surface formed on one end of the drive changing shaft. The stopper surface is effective to abut against the stopper arm in the two-wheel drive position of the drive changing shaft and is effective to prevent the shift-and-select lever from engaging the shift head fixed to the fork shaft for a low speed gear.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
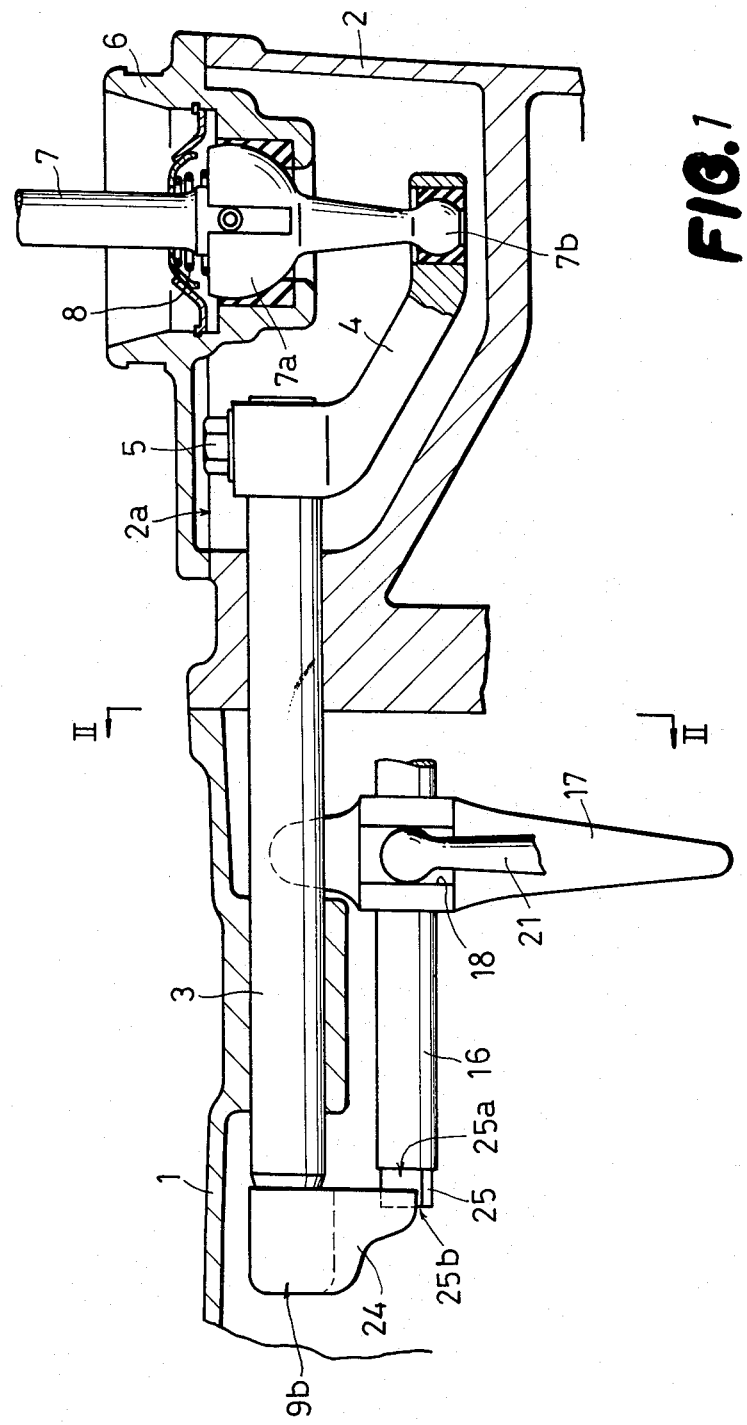
FIG. 1 is a vertical cross-sectional view of a part of the manual transmission according to the present invention.

Referring now to FIG. 1 which shows a part of a manual transmission, reference numeral 1 designates a transmission casing and reference numeral 2 designates an extension housing rearwardly extending from the transmission casing 1. Reference numeral 3 designates a shift-and-select lever shaft accommodated in and supported by the transmission casing 1 and the extension housing 2. The shift-and-select lever shaft 3 is adapted to rotate about its axis and to slide in its axial direction. The right-hand end of the shift-and-select lever shaft 3 as viewed in FIG. 1 is disposed in the extension housing 2 and is fixedly connected to a lever housing 4 by a bolt 5. Reference numeral 6 designates a retainer for a speed change lever 7. The retainer 6 is mounted on the upper opening portion 2a of the extension housing 2 by bolts (not shown). A large spherical portion 7a of the speed change lever 7 is supported by the retainer 6 in such a manner that a coil spring 8 is effective to downwardly bias against the large spherical portion 7a, so as to effect the shift-and-select operations. The speed change lever 7 extends downwardly from the large spherical portion 7a to form a small spherical portion 7b at its lower end. The small spherical portion 7b is connected to the lever housing 4 by way of ball-joint. With this arrangement, when the speed change lever 7 is select-operated, the shift-and-select lever shaft 3 is rotated about its axis, and in turn, when the speed change lever 7 is shift-operated, the shift-and-select lever shaft 3 is slided in its axial direction.

Figure 2:
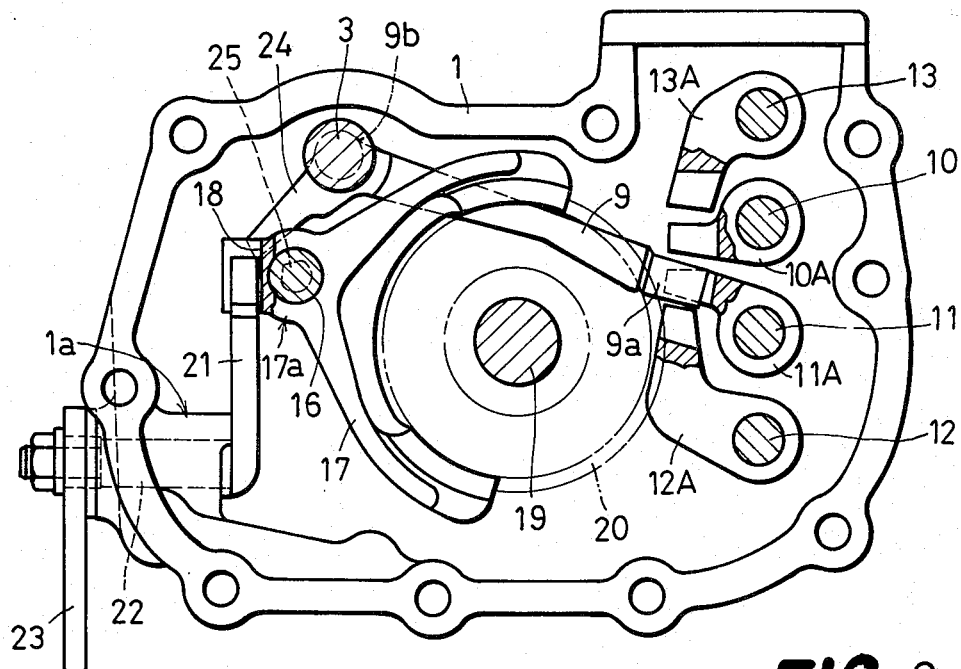
FIG. 2 is a cross-sectional view taken along the line II-II in FIG. 1.
Figure 3:
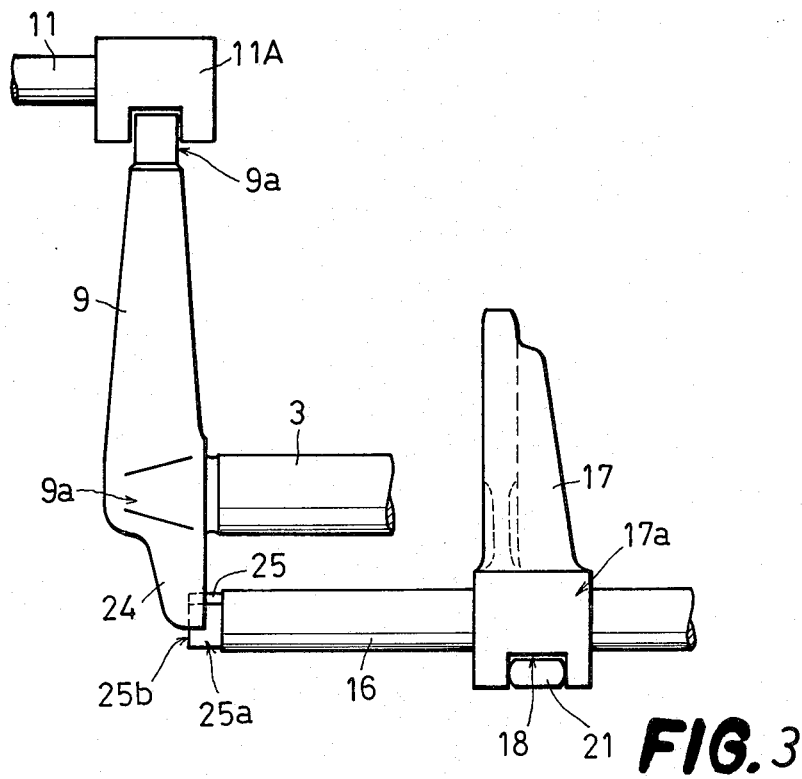
FIG. 3 is a plan view illustrating the relation between parts of a shift-and-select operation system and parts of a drive changing system.

As shown in FIGS. 2 and 3, the shift-and-select lever shaft 3 is fixed to a shift-and-select lever 9 at the left-hand end thereof. Reference numerals 10, 11 and 12 are fork shafts for the first-second speed gears, the third-fourth speed gears and the fifth-reverse speed gears, respectively. Three fork shafts 10, 11 and 12 are disposed in the transmission casing 1 and are arranged in parallel relation to the shift-and-select lever shaft 3. Reference numeral 13 is a fork shaft for a low speed gear. The fork shaft 13 is arranged above and in parallel relation with the fork shaft 10 for the first-second speed gears. Shift heads 10A, 11A, 12A and 13A are fixedly supported to the fork shafts 10, 11, 12 and 13, respectively. Being accompanied with rotation of the shift-and-select lever shaft 3 by the select-operation, the free end 9a of the shift-and-select lever 9 is so positioned as to selectively engage any one of the shift heads 10A through 13A. However, when the speed change lever 7 is in the select-return position, the shift-and-select lever 9 is usually engaged with the shift head 11A for the third-fourth speed gears as shown in FIGS. 2 and 3. By the sliding action of the shift-and-select lever shaft 3 generated by the shift operation, the fork shaft selected by the aforementioned select operation is slided in its axial direction to obtain a desired shift position through a shift fork (not shown).

As is best seen in FIG. 2, a drive changing shaft 16 for effecting change from a two-wheel drive operation to a four-wheel drive operation and vice versa is arranged in parallel relation with the shift-and-select lever shaft 3 and is adapted to slide in its axial direction. A fork 17 is fixed to the shaft 16, so as to hold on an output shaft 19 of the transmission a clutch hub sleeve 20 for effecting change from a two-wheel drive operation to a four-wheel drive operation and vice versa. A boss 17a of the fork 17 is provided with a groove 18 adapted to engage a free end of an inner lever 21 in a drive changing system. Another free end of the inner lever 21 is fixed to a lever pin 22 rotatably supported by a pin receiving portion 1a formed on the inner wall of the transmission casing 1. The lever pin 22 is fixed to an outer lever 23 outside of the transmission casing 1. When another speed change lever (not shown) for effecting change from a two-wheel drive operation to a four-wheel drive operation and vice versa is operated, the outer lever 23 is rotated with the lever pin 22 and the fork 17 is moved with the drive changing shaft 16 in its axial direction by the movement of the inner lever 21. As the result, the clutch hub sleeve 20 is moved in the axial direction of the output shaft 19, thereby effecting change from a two-wheel drive operation to a four-wheel drive operation and vice versa.

The low speed gear is usually employed in a four-wheel drive operation and if the low speed gear is employed in a two-wheel drive operation, the aforementioned harmful influence is involved. Accordingly, it is necessary to prevent the shift operation to the low speed gear in a two-wheel drive operation.

FIG. 3 shows a mechanism for preventing a misoperation to meet the above-mentioned requirements. A stopper arm 24 is integrally formed with the shift-and-select lever 9 and extends from the portion 9b fixed to the lever shaft 3 in the opposed direction to the lever 9. A projected portion 25 is integrally formed with the drive changing shaft 16 at the left-hand end thereof as viewed in FIG. 3. The projected portion 25 has a stopper surface 25a along its outer circumference adapted to stop undue rotation of the stopper arm 24. When the drive changing shaft 16 is in the two-wheel drive position as shown in FIGS. 1 through 3, the stopper surface 25a is effective to abut against the stopper arm 24. In other words, in the two wheel drive position of the drive changing shaft 16, when the shift-and-select lever shaft 9 is so select-operated into the position as to engage the shift head 10A of the first-second speed gears as illustrated by the phantom line in FIG. 4, the stopper arm 24 is brought into abutment against the stopper surface 25a. On the other hand, when the drive changing shaft 16 is operated into the four-wheel drive position, the projected portion 25 of the shaft 16 is moved to the position as shown in FIG. 5 and as the result, the stopper arm 24 is released from abutment against the stopper surface 25a of the projected portion 25.

Figure 4:
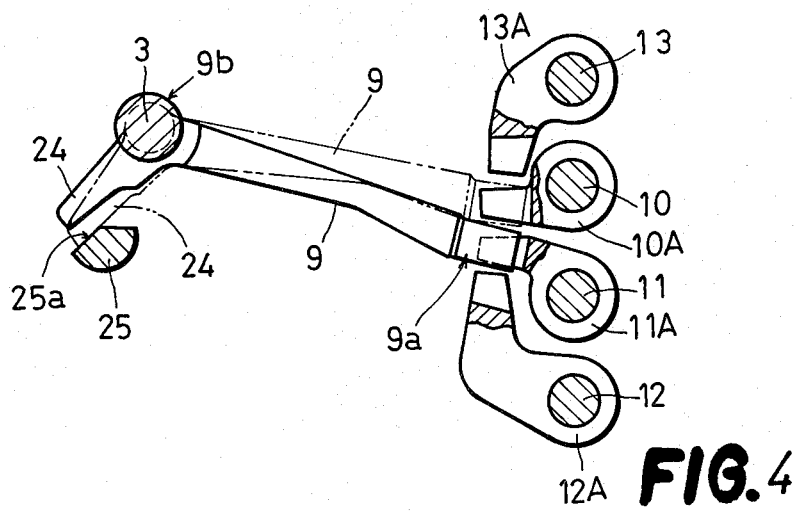
FIG. 4 is a cross-sectional view illustrating the relation between essential parts in FIG. 2.
Figure 5:
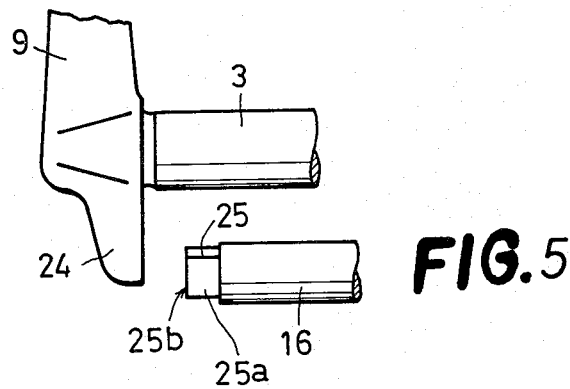
FIG. 5 is a plan view similar to FIG. 3, illustrating the four-wheel drive operation by moving the drive changing shaft.
Figure 6:
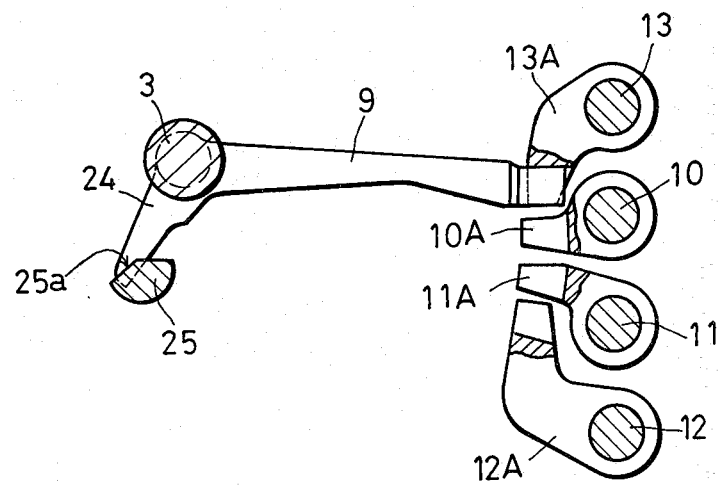
FIG. 6 is a cross-sectional view similar to FIG. 4, illustrating the select-operation of the shift-and-select lever to a low speed gear.

In operation, in the two-wheel drive position of the drive changing shaft 16, when the shift-and-select lever 9 is select-operated into the shift head 10A of the first-second speed gears, the stopper surface 25a on the drive changing shaft side is effective to abut against the stopper arm 24 on the shift-and-select lever side, thereby preventing the shift-and-select lever 9 from being select-operated to the shift head 13A for the low speed gear as illustrated by the phantom line in FIG. 4. Furthermore, when the drive changing shaft 16 is in the four-wheel drive position as shown in FIG. 5, the stopper surface 25a is released from abutment against the stopper arm 24. Accordingly, the shift-and-select lever 9 may be select-operated to the shift head 13A for the low speed gear as shown in FIG. 6. In this condition, even when the drive changing shaft 16 is forced to move from the four-wheel drive position to the two-wheel drive position, that is, move leftwardly in FIG. 5, the end surface 25b of the projected portion 25 of the shaft 16 is brought into abutment against the side surface of the stopper arm 24, thereby preventing the change to the two-wheel drive position in the selected position of the low speed gear.

According to the preferred embodiment, the stopper arm 24 is constructed to extend from the shift-and-select lever 9 in the opposed direction; however, it may be constructed to project from a part of the shift-and-select lever shaft 3 toward the drive changing shaft 16, so as to effect abutment against the stopper surface 25a of the shaft 16.

Having thus described the preferred embodiments of the invention it should be understood that numerous structural modifications and adaptations may be restored to without departing from the spirit of the invention.

What is claimed is:

1. In combination with a manual transmission for an automotive vehicle having a transmission casing, a shift-and-select lever shaft mounted on said transmission casing and effective to rotate about and slide along its axis, said shift-and-select lever shaft being adapted to coact with a speed change lever, shift heads of fork shafts for a low speed gear, first-second speed gears, third-fourth speed gears and fifth-reverse speed gears, a shift-and-select lever fixed to and projecting laterally from said shift-and-select lever shaft, said shift-and-select lever being selectively engagable with any one of said shift heads by rotation of said shift-and-select lever shaft and a drive changing shaft arranged in parallel relation with said shift-and-select lever shaft and adapted to move along its axis in said transmission casing, said drive changing shaft effecting change from a two-wheel drive operation to a four-wheel drive operation and vice versa by its axial movement; a mechanism for preventing misoperation in a manual transmission comprising a stopper arm projecting laterally from said shift-and-select lever shaft and a stopper surface formed on one end of said drive changing shaft, said stopper surface being in abutment against said stopper arm under the condition that said shift-and-select lever is engaged with said shift head for the first-second speed gears to prevent said shift-and-select lever from rotating toward said shift head for the low speed gear in the two-wheel drive operation.

2. The mechanism for preventing misoperation in a manual transmission as defined in claim 1 wherein said stopper arm is formed integrally with said shift-and-select lever.

* * * * *